(12) United States Patent
Cox (10) Patent No.: US 8,727,696 B2
(45) Date of Patent: May 20, 2014

(54) CALIBRATION OF AN ACTUATOR FOR A VARIABLE GEOMETRY TURBINE

(75) Inventor: Calvin Howard Cox, Mirfield (GB)

(73) Assignee: Cummins Turbo Technologies Limited, Huddersfield (GB)

(*) Notice: Subject to any disclaimer, the term of this patent is extended or adjusted under 35 U.S.C. 154(b) by 535 days.

(21) Appl. No.: 12/689,728

(22) Filed: Jan. 19, 2010

(65) Prior Publication Data
US 2010/0119355 A1    May 13, 2010

Related U.S. Application Data

(63) Continuation of application No. PCT/GB2008/001950, filed on Jun. 6, 2008.

(30) Foreign Application Priority Data

Jul. 18, 2007 (GB) .................................. 0713951.2

(51) Int. Cl.
*F01D 17/10* (2006.01)
*F01D 17/20* (2006.01)

(52) U.S. Cl.
USPC ............... 415/1; 415/118; 415/150; 415/158; 29/407.05; 29/889.2; 33/1 PT; 73/1.75; 324/207.25; 324/202

(58) Field of Classification Search
USPC ........... 415/1, 118, 150, 157, 158; 29/407.05, 29/889.2; 33/1 PT; 73/1.75; 324/207.25, 324/202
See application file for complete search history.

(56) References Cited

U.S. PATENT DOCUMENTS

| 4,718,819 A | * | 1/1988 | Rogo et al. ..................... 415/158 |
| 4,920,784 A | * | 5/1990 | Gonsior ......................... 73/1.75 |
| 5,044,880 A | * | 9/1991 | McKean ......................... 415/158 |

(Continued)

FOREIGN PATENT DOCUMENTS

EP   0 111 781   6/1984
WO   WO 02/062604   8/2002

OTHER PUBLICATIONS

International Search Report, PCT/GB2008/001950, Cummins Turbo Technologies Limited, Oct. 6, 2008.

*Primary Examiner* — Christopher Verdier
(74) *Attorney, Agent, or Firm* — Krieg DeVault LLP; Clifford W. Browning (57) ABSTRACT

A variable geometry turbine of the kind used in a turbocharger has a variable geometry element such as a nozzle ring or an annular array of swing vanes that is operated by an actuator. The actuator has an output shaft coupled to a transmission mechanism for moving the variable geometry element. A rotary sensor device coupled to the output shaft of the actuator has a sensor wheel with a stop, slip clutch mechanism and a rotary position sensor. The device converts movement of the actuator output shaft into rotation of the wheel and the sensor generates an output signal representative of the rotary position of the wheel to provide a value indicative of the position of the variable geometry element. The actuator is calibrated to the position of the variable geometry element by rotating the sensor wheel in a first rotational direction until the variable geometry element reaches the first limit position, then rotating the sensor wheel in a second direction until the variable geometry element reaches the second limit position. The value of the output signal is logged at one of these positions as a limit value. The sensor wheel is allowed to declutch in the event that it encounters the stop in either direction of rotation. The output signal is monitored and the limit value is deducted to determine the position of the variable geometry element.

19 Claims, 5 Drawing Sheets

(56) References Cited

U.S. PATENT DOCUMENTS

| | | |
|---|---|---|
| 6,076,353 A | 6/2000 | Freudenberg et al. |
| 6,203,272 B1 * | 3/2001 | Walsham ................ 415/158 |
| 6,736,233 B2 * | 5/2004 | Beishline et al. ............ 180/334 |
| 6,788,048 B2 * | 9/2004 | Hedayat et al. ............... 324/202 |
| 6,895,751 B1 * | 5/2005 | Greentree ...................... 60/602 |
| 2003/0080732 A1 * | 5/2003 | Okazaki et al. .......... 324/207.25 |

* cited by examiner

CALIBRATION OF AN ACTUATOR FOR A VARIABLE GEOMETRY TURBINE

CROSS REFERENCE TO RELATED APPLICATIONS

The present application is a continuation of PCT/GB2008/001950 filed Jun. 6, 2008, which claims priority to United Kingdom Patent Application No. 0713951.2 filed Jul. 18, 2007, each of which are incorporated herein by reference.

The present invention relates to an actuator and a method for the automatic calibration of the actuator being of the kind for actuating a variable geometry mechanism such as a nozzle ring or swing vane ring of a variable geometry turbine typically used in a turbocharger for an internal combustion engine. It also relates to a variable geometry turbine and turbocharger including such an actuator.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housing.

In known turbochargers, the turbine stage comprises a turbine chamber defined by the turbine housing and within which the turbine wheel is mounted, an annular inlet passageway arranged around the turbine chamber, an inlet arranged around the inlet passageway, and an outlet passageway extending from the turbine chamber. The passageways and chambers communicate such that pressurised exhaust gas admitted to the inlet chamber flows through the inlet passageway to the outlet passageway via the turbine chamber and rotates the turbine wheel.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suit varying engine demands. One common type of variable geometry turbine has vanes which extend into the inlet passageway and which can be pivoted to alter the effective cross-sectional area available for incoming gas, as well as the angle of approach of the gas to the turbine wheel. Such arrangements are generally referred to as swing vane variable geometry turbines. Typically each vane is pivotable about its own axis, and all vanes can be pivoted in unison by operation of an actuating mechanism linked to each of the vanes, often by a ring referred to as a unison ring.

In another common type of variable geometry turbine, one wall of the inlet passageway is defined by a moveable wall member (generally referred to as a "nozzle ring"). The position of the nozzle ring relative to a facing wall (sometimes referred to as the shroud) of the inlet passageway is adjustable to control the width of the inlet passageway. For instance, as gas flowing through the turbine decreases the inlet passageway width may also be decreased to maintain gas velocity and optimise turbine output. Typically the nozzle ring is provided with vanes, which extend into the inlet passageway and through slots provided on the facing wall of the inlet passageway to accommodate movement of the moveable nozzle ring. Alternatively, vanes may extend from a fixed wall through slots provided in the nozzle ring. The nozzle ring is generally supported on rods extending parallel to the axis of rotation of the turbine wheel and is moved by an actuator, which is operable to displace the rods in an axial direction.

Various forms of actuators are known for use with variable geometry turbines, including pneumatic, hydraulic and electric actuators, mounted externally of the turbocharger and connected to the variable geometry system via appropriate gears and/or linkages. For instance, known electric actuators comprise an electric motor mounted to the turbocharger housing and connected via a gear and mechanical linkage to movable elements of the variable geometry system. When such an actuator is fitted to a turbocharger it is essential for correct operation that its output gear is in precise alignment with the position of the nozzle ring. In particular, since the actuator and the nozzle ring each have a limited range of travel it is necessary to ensure that neither encounters an end limit during operation. When the actuator is mounted to the turbocharger the precise axial position of the nozzle ring relative to the rotational position of the actuator output gear is unknown and difficult to ascertain. In order to ensure correct operation it is currently necessary to use a manual calibration process whereby the nozzle ring position and the rotational position of the actuator output are pre-aligned. Since the components of the actuator and variable geometry system are housed in a confined space this is not a straightforward operation. It is therefore necessary to incorporate specific and relatively complex calibration procedures in the installation, servicing, or replacement operations.

It is therefore desirable to make the calibration process as simple as possible to reduce production line assembly time and servicing or repair time thereby reducing costs.

According to a first aspect of the present invention there is provided a method for automatically calibrating a variable geometry turbine actuator, the turbine having an annular inlet passageway, the passageway being closable at least partially by adjusting the position of a variable geometry element, the variable geometry element being movable between first and second limit positions, the method comprising the steps of: providing the turbine with an actuator having an output shaft; coupling the actuator output shaft to a transmission mechanism for moving the variable geometry element; providing a rotary sensor device coupled to the output shaft of the actuator, the rotary sensor comprising a sensor wheel with a stop, a clutch mechanism and a rotary position sensor, the device being arranged to convert movement of the actuator output shaft into rotation of the wheel, the wheel having a rotational range that is limited by said stop, the sensor being configured to generate an output signal representative of the rotary position of the wheel; operating the actuator output shaft so as to rotate the sensor wheel in a first rotational direction until the variable geometry element reaches the first limit position; operating the actuator output shaft so as to rotate the sensor wheel in a second direction until the variable geometry element reaches the second limit position; allowing the sensor device to declutch from the actuator in the event the wheel is prevented from rotating by the stop in either direction of rotation, thereby ensuring the range of movement of the variable geometry element in use occurs within the rotational range of the sensor; and logging, as a limit value, the value of said output signal generated when the variable geometry element is at one of said first or second limit positions.

The method pre-aligns the actuator output shaft relative to the variable geometry element without the need for complex calibration procedures by ensuring that the sensor wheel rotation encompasses the range over which the variable geometry element is operated.

The range of movement of the variable geometry element in use may be a shorter range than that between the first and second limits. Ensuring that the range of movement of the variable geometry element occurs within the rotational range of the sensor includes the possibility of one end of the range of movement coinciding with one end of the rotational range of the sensor wheel.

The limit value may be logged at the second limit position and the actuator output shaft may be moved so as to rotate the sensor wheel in said first rotational direction again, after step until the variable geometry element reaches the first limit position. The value of the output signal at said first limit position is logged as a further limit value after the wheel is rotated in the first rotation direction again. The logged limit value or further limit value can then be used as an offset value to determine the position of the variable geometry element from the output signal of the sensor, the offset being deducted from the signal value at any point in time to establish the position.

The method may further comprise the step of monitoring said output signal during operation of the actuator and deducting one of the limit value or the further limit value from the output signal and using this to determine the position of the variable geometry element.

The method may also comprise the step of monitoring said output signal during operation of the actuator and deducting the offset value from the output signal and using this to determine the position of the variable geometry element. This can be used as part of a feedback control loop for a servomotor actuator or can be logged separately.

The annular inlet passageway may be defined between facing annular walls of the turbine and the variable geometry element may be a movable one of the annular walls.

The movable annular wall may be translatable along its central axis to adjust the width of the annular passageway. The actuator may drive a leadscrew transmission mechanism in rotation. The leadscrew mechanism may comprise a leadscrew shaft and a leadscrew nut threadedly engaged on a threaded portion of the leadscrew shaft, the leadscrew mechanism being arranged so that rotation of one of said shaft and nut relative to the other produces linear movement in the other of said shaft and nut in the direction of the leadscrew axis, the leadscrew transmission mechanism being connected between the variable geometry element and the actuator.

In one embodiment, the nut is connected to the variable geometry element by a linkage, and the method further comprises the step of driving the leadscrew shaft in rotation and restraining the nut against rotation so as to effect movement in the linkage and therefore the variable geometry element.

The method may further comprise the step of using a gear wheel to couple the output shaft and the sensor wheel.

The method may further comprise the step of providing a slip clutch between the gear wheel and the sensor wheel.

The output signal may be transmitted to a microcontroller for digitising.

According to a second aspect of the present invention there is provided an actuator with sensor device for a variable geometry turbine, the turbine having an annular inlet passageway, the passageway being closable at least partially by adjusting the position of a variable geometry element, the variable geometry element being movable between first and second limit positions, the actuator comprising: an output shaft for coupling to a transmission mechanism for moving the variable geometry element; a rotary sensor device coupled to the output shaft of the actuator, the rotary sensor comprising a sensor wheel with a stop and clutch mechanism and a rotary position sensor; the rotary sensor device being arranged to convert movement of the actuator output shaft into rotation of the wheel, the wheel having a rotational range that is limited by said stop, the sensor being configured to generate an output signal representative of the rotary position of the wheel; the sensor wheel being rotatable by the actuator in a first rotational direction until the variable geometry element reaches the first limit position and in a second direction until the variable geometry element reaches a second limit position; the clutch mechanism allowing the sensor wheel to declutch in the event that it encounters the stop in either direction of rotation.

A monitor for monitoring said output signal during operation of the actuator may be provided either local to the actuator or remotely. Similarly means for transmitting the output signal to a memory device when the variable geometry element is at least one of the first or second limit positions may be provided locally or otherwise.

A signal processor may be provided, locally or otherwise, for deducting a logged output signal value corresponding to the value at one of the first and second limit positions from the output signal and using this to determine the position of the variable geometry element at any point in time.

A gear wheel may couple the output shaft and the sensor wheel.

The clutch mechanism may be a slip clutch between the gear wheel and the sensor wheel.

The sensor wheel may be fixed to a shaft of the sensor device and the gear wheel is rotationally mounted on the shaft, the slip clutch comprising a biasing element for biasing the gear wheel into frictional contact with the sensor wheel.

The biasing element may be configured such that the torque applied to the gear wheel is sufficient to overcome the friction contact with the sensor wheel when sensor wheel is prevented from rotating by the stop.

The monitor and the signal processor may be provided in a microprocessor.

The actuator may have a rotary output which may be in the form of a shaft. The actuator may be a motor or servomotor.

The transmission mechanism may comprise a leadscrew shaft and a leadscrew nut threadedly engaged on a threaded portion of the leadscrew shaft, the leadscrew mechanism being arranged so that rotation of one of said shaft and nut relative to the other produces linear movement in the other of said shaft and nut in the direction of the leadscrew axis, the leadscrew transmission mechanism being connected between the variable geometry element and the actuator.

According to a third aspect of the present invention there is provided a variable geometry turbine comprising:

a turbine wheel mounted within a turbine housing on a shaft for rotation about an axis, the turbine housing defining an annular turbine inlet passageway around the turbine wheel;

the passageway being closable at least partially by adjusting the position of a variable geometry element, the variable geometry element being movable between first and second limit positions, a transmission mechanism for moving the variable geometry element; and an actuator as defined above and coupled to the transmission mechanism for actuating the variable geometry element.

The variable geometry element may be a movable annular wall defining part of said passageway. The movable wall may be translatable along an axis to adjust the width of the annular passageway.

According to a fourth aspect of the present invention there is provided a turbocharger comprising a variable geometry turbine as defined above and further comprising a rotary turbocharger shaft on which said turbine wheel is mounted, a compressor wheel mounted within a compressor housing on the other end of said turbocharger shaft for rotation with the turbine wheel about said axis.

A bearing housing may be interposed between the turbine and compressor housings, the actuator being mounted in the bearing housing.

A specific embodiment of the present invention will now be described, by way of example only, with reference to the accompanying drawings, in which:

FIGS. 6(a-c) and 7 are diagrams that illustrate the range of operation of the sensor.

Figure 1:
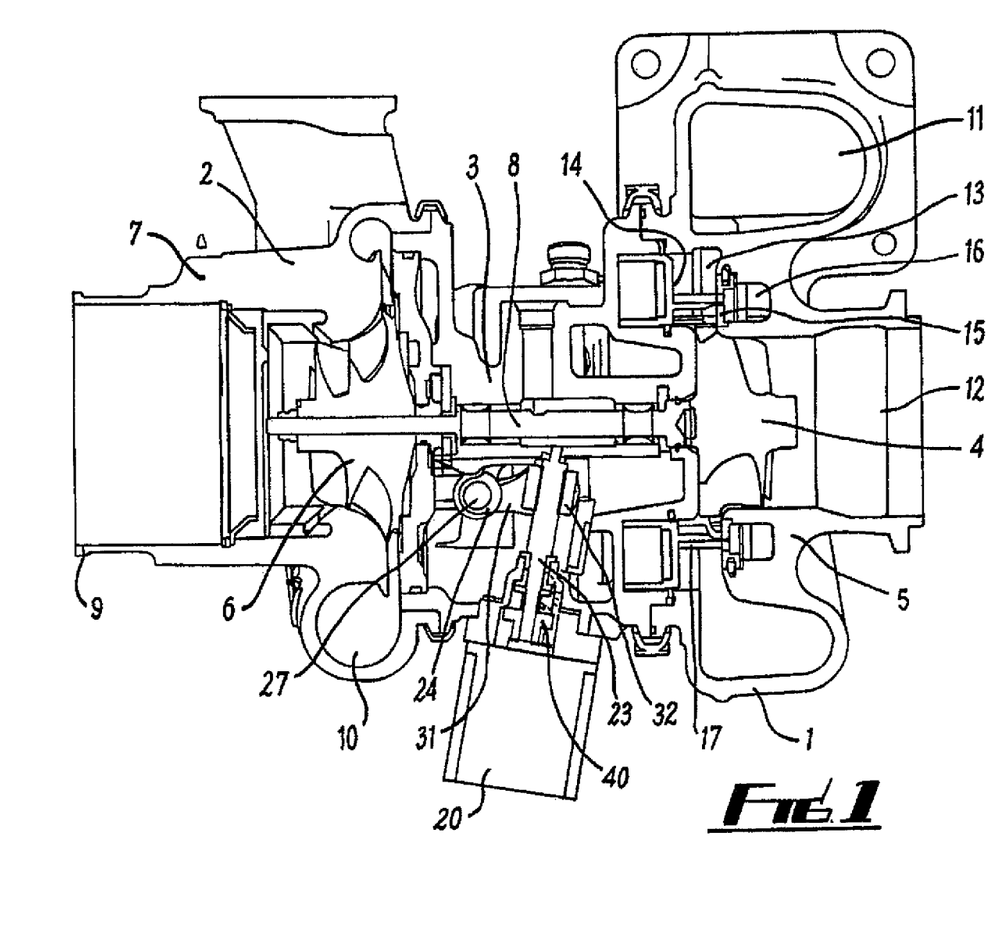
FIG. 1 is an axial cross-section through a turbocharger including a variable geometry turbine and an actuator used in the present invention.

Referring to FIG. 1, the illustrated turbocharger comprises a turbine 1 joined to a compressor 2 via a central bearing housing 3. The turbine 1 comprises a turbine wheel 4 rotating within a turbine housing 5. Similarly, the compressor 2 comprises a compressor wheel 6 that rotates within a compressor housing 7. The turbine wheel 4 and compressor wheel 6 are mounted on opposite ends of a common turbocharger shaft 8 that extends through the central bearing housing 3.

As is conventional, the bearing housing 3 has a central portion which houses journal bearing assemblies located towards the compressor and turbine ends of the bearing housing respectively.

In use, the turbine wheel 4 is rotated by the passage of exhaust gas passing over it from the internal combustion engine. This in turn rotates the compressor wheel 6 that draws intake air through a compressor inlet 9 and delivers boost air to the inlet manifold of an internal combustion engine via an outlet volute 10.

The turbine housing 5 defines an inlet chamber 11 (typically a volute) to which the exhaust gas from an internal combustion engine is delivered. The exhaust gas flows from the inlet chamber 11 to an axially extending outlet passageway 12 via an annular inlet passageway 13 and turbine wheel 4. The inlet passageway 13 is defined on one side by the face of a radial wall of a movable annular wall member 14, commonly referred to as a "nozzle ring", and on the opposite side by an annular shroud plate 15 that forms the wall of the inlet passageway 13 facing the nozzle ring 14. The shroud plate 15 covers the opening of an annular recess 16 in the turbine housing 5.

The nozzle ring 14 supports an array of circumferentially and equally spaced inlet vanes 17 each of which extends axially across the inlet passageway 13. The vanes 17 are orientated to deflect gas flowing through the inlet passageway towards the direction of rotation of the turbine wheel 4. When the nozzle ring 14 is proximate to the annular shroud plate 15, the vanes 17 project through suitably configured slots in the shroud plate, into the recess 16. The vanes 17 seal against the edges defining the slots so as to prevent any significant flow of gas into the recess 16 when the nozzle ring 14 is proximate the shroud plate 15.

The speed of rotation the turbine wheel 4 is dependent upon the velocity of the gas passing through the annular inlet passageway 13. For a fixed rate of mass of gas flowing into the inlet passageway, the gas velocity is a function of the gap between the nozzle ring 14 and the shroud 15 that defines the passageway 13 and is adjustable by controlling the axial position of the nozzle ring 14 (as the inlet passageway 13 gap is reduced, the velocity of the gas passing through it increases).

Figure 2:
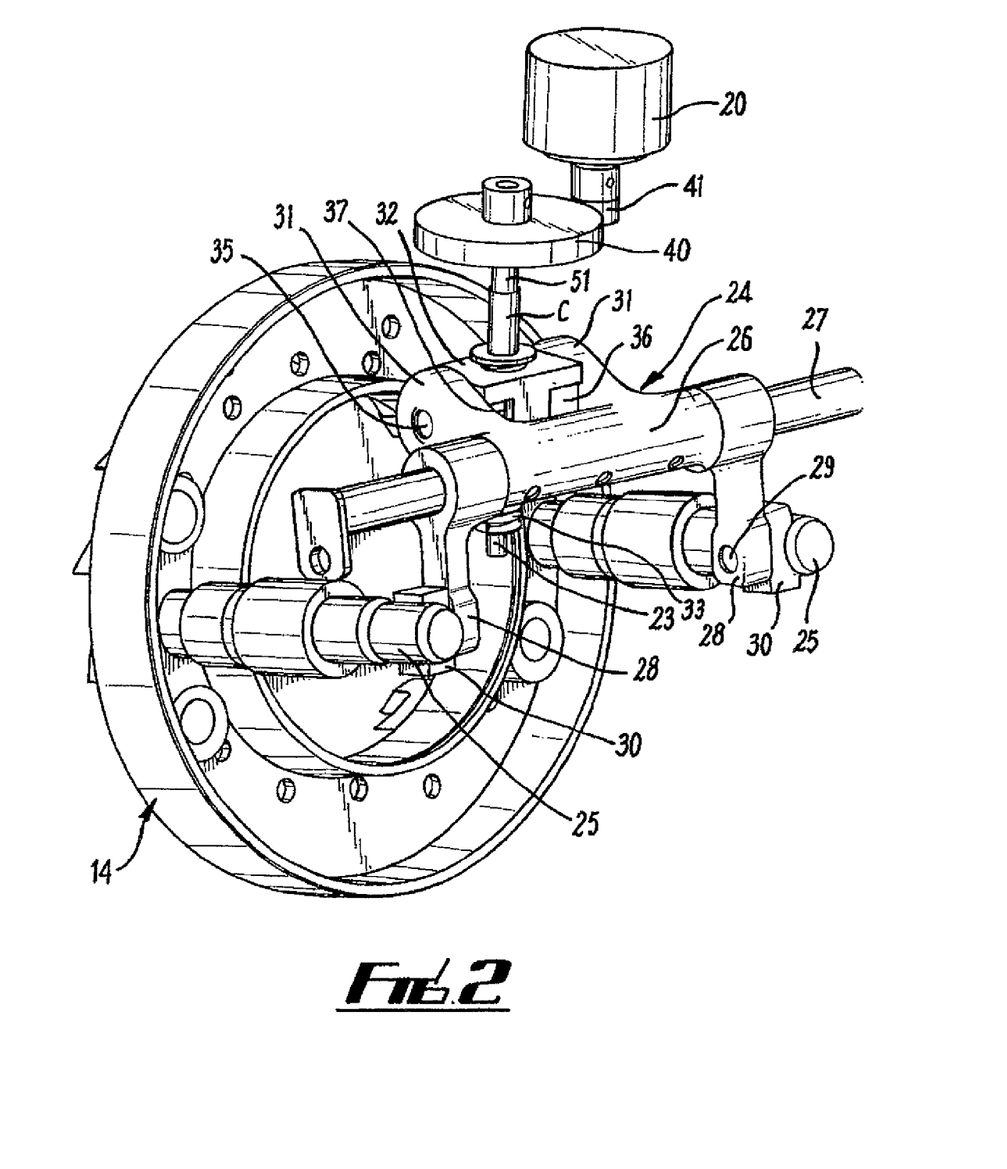
FIG. 2 is an enlarged perspective view of components of a nozzle ring actuator assembly for the variable geometry turbine, the components depicted as removed from the turbocharger of FIG. 1 for clarity.
Figure 3:
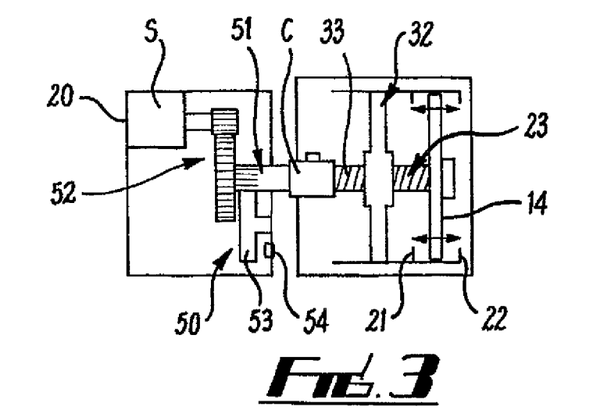
FIG. 3 is a schematic illustration of an output of the actuator, its connection to the variable geometry turbine of FIG. 1 and a sensor wheel used in the calibration of the actuator in accordance with the present invention.

Referring now to FIGS. 2 and 3 as well as FIG. 1, the nozzle ring 14 is coupled to an actuator 20 for controlled axial positioning. In this embodiment the actuator 20 is in the form of an electric motor with a rotary output shaft. However, any suitable actuator may be used including, for example, a rack and pinion mechanism. The ring 14 is mounted for translation between first and second limits 21, 22 (represented schematically in FIG. 3). The electric motor drives a lead screw 23 that engages a yoke 24 which in turn engages support rods 25 on which the nozzle ring 14 is supported.

In more detail, the yoke 24 comprises a cylindrical sleeve 26 mounted for rotation within the bearing housing oil cavity concentrically on a cross-shaft 27 whose ends are supported in bearing housing 3. The shaft 27 is fixed against rotation but the yoke 24 is freely floating on the shaft 27 for rotation about its axis. The yoke 24 has a first pair of arms 28 extending radially from the yoke sleeve 26, each of which engages an end of a respective nozzle ring support rod 25 via a pin 29 and sliding block 30. A second pair of arms 31, inboard of the first pair of arms 28, extends radially from the sleeve 26 in a different direction to the first arms 28.

The second yoke arms 31 are pivotally connected to a lead screw nut 32 which is threaded on a threaded portion 33 of a lead screw shaft 23. The pivotal engagement is provided by way of pins 35 which extend from each arm 31 into respective sliding blocks 36 which are received within slots 37 defined in the lead screw nut 32. The pins 35 are fixed relative to the arms 31 and are pivotally received within the sliding blocks 36 which are constrained against movement relative to the lead screw nut 32 in the direction of the axis of the lead screw shaft 23, but are free to slide within the lead screw slots 37 in a direction generally perpendicular to the axis of the lead screw shaft 23.

The electric motor 20 is provided to rotate the lead screw shaft 23 either directly or, as illustrated, via a spur gear 40 that engages a pinion 41 driven by the motor. The spur gear 40 and pinion 41 are located in a gear housing bolted to the turbine housing 5.

In operation, the motor 20 is controlled to rotate the lead screw shaft 23. The lead screw nut 32 is secured against rotation relative to the yoke 24 by the sliding blocks 36 that engage the nut 32 within the slots 37. The lead screw shaft 23 is free to rotate but is constrained against movement along its axis. Accordingly, rotation of the lead screw shaft 23 produces linear movement in the lead screw nut 32 in the direction of the axis of the screw shaft 23. This linear motion effects rotation of the yoke 24 about its shaft 27. Although the ends of the yoke arms 31 transcribe an arc of a circle, off-axis motion is accommodated by the sliding blocks 36 which are free to slide within the screw nut 32 as described above.

As the yoke 24 rotates about the shaft 27 the first yoke arms 28 cause the support rods 25, and thus nozzle ring 14, to move back and forth in the direction of the axis of the turbocharger (depending on the direction of rotation of the motor 20) between the first and second limits 21, 22 to thereby vary the turbine inlet width.

The output shaft 51 of the spur gear 40 is shown (schematically in FIG. 3) as being coupled to the leadscrew 23 at C. Accordingly, by appropriate control of the motor 20 the axial position of the nozzle ring 14 can be controlled. It will be appreciated that details of the nozzle ring mounting and guide arrangements may differ from those illustrated. In the schematic diagram of FIG. 3 the nozzle ring 14 is depicted adjacent to the leadscrew 23 for simplicity and its travel between limits 21 and 22 is represented by the arrows.

Figure 4:
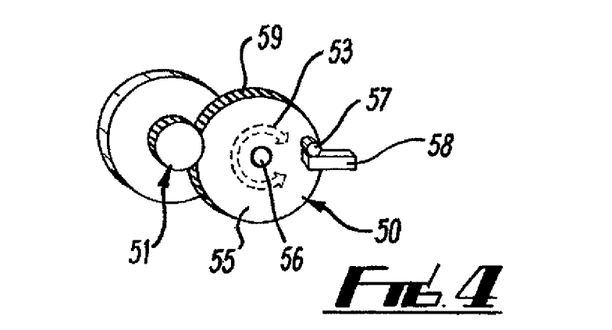
FIG. 4 is a schematic representation of the output gear and sensor wheel associated with the actuator of FIGS. 1 to 3, illustrating the operation during calibration of the actuator.
Figure 5:
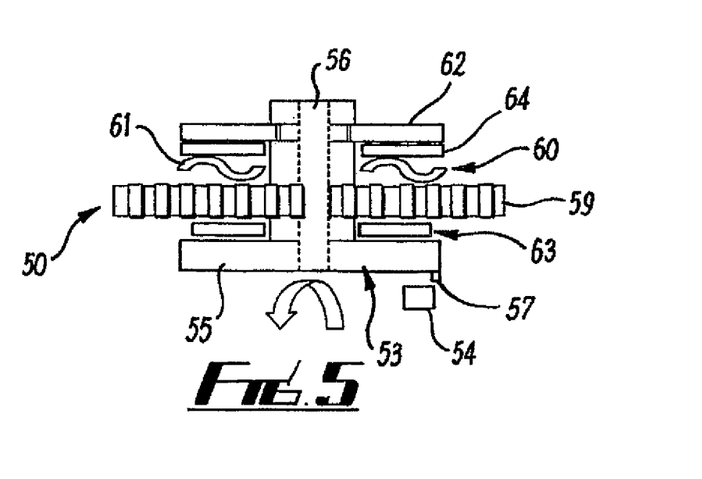
FIG. 5 is a schematic illustration of an embodiment of the mounting arrangement of the actuator output and sensor wheel of FIG. 3.

The actuator 20 may be in the form of a servomotor (indicated by reference S in FIG. 3) to allow for precision control. A sensor device 50 associated with the actuator 20 is used to generate a linear output voltage representative of the rotational position of the output shaft 51 of the spur gear is represented in FIG. 3 as being the output shaft of the servomotor unit including the associated gear transmission 52. It will be appreciated that any convenient form of transmission between an output shaft of the motor 20 and the leadscrew 23 may be adopted. The sensor device 50 comprises a sensor wheel 53 and an associated rotary position sensor 54. The sensor wheel 53, shown in FIGS. 3 to 5, is geared to the servomotor output shaft 51 and the sensor 54 (shown in FIGS. 2 and 4) provides an electrical output voltage in proportion to the angular displacement of the wheel 53. There are many suitable sensors that will be known to the person skilled in the art including, for example, a potentiometer arrangement that senses variations in electrical resistance or magnetic based arrangements using an array of Hall effect sensors that generate a voltage when exposed to magnetic flux. The sensor wheel 53 is geared to the actuator output shaft with an appropriate reduction ratio that ensures the angular displacement of the output shaft required for the nozzle ring 14 to move over the full distance between the first and second limits 21, 22 translates into just less than (e.g. 95% of) a full 360° rotation of the sensor wheel 53. This ensures that the range of axial translation of the nozzle ring 14 occurs within one revolution of the sensor wheel 53 but allows for a reasonable resolution of the rotation sensor output.

The sensor wheel 53 comprises a front disc 55 on a shaft 56 and fitted with a pin 57 that extends radially or axially from its periphery. During rotation of the wheel 53 with the shaft 56 the pin 57 comes into abutment with an adjacent fixed limit stop 58 as illustrated in FIG. 4. The sensor wheel 53 is driven in rotation by a gear wheel 59 that is connected to the shaft by a slip clutch arrangement 60 such that if the front disc 55 is prevented from rotating by virtue of engagement of the pin 57 with the limit stop 58, the gear wheel 59 continues to rotate relative to the shaft 56. In the exemplary embodiment shown in FIG. 5, the gear wheel 59 is held against the front disc 55 by a spring washer 61 interposed between the gear wheel 59 and a circlip 62 that is axially fixed to the shaft 56. A fibre washer 63 is disposed between the front disc 55 and the gear wheel 59 and a further washer 64 is disposed between the circlip 62 and the spring washer 61. When the actuator 20 is rotated it drives the gear wheel 59 in rotation, which carries with it the front disc 55 by virtue of friction engagement with the fibre washer 63. Upon encountering the limit stop 58, the front disc 55 stops rotating and the gear wheel 59 is able to slip relative to the spring washer 61 so as to rotate relative to the shaft 56.

Movement and positional control of the nozzle ring 14 is achieved by providing a controlled voltage to the servomotor S, which in turn drives the nozzle ring 14 via the output shaft 51 the coupling C and the leadscrew mechanism 23. The actual nozzle position along the length of its traverse can be accurately calculated from the output voltage.

Figure 6A:
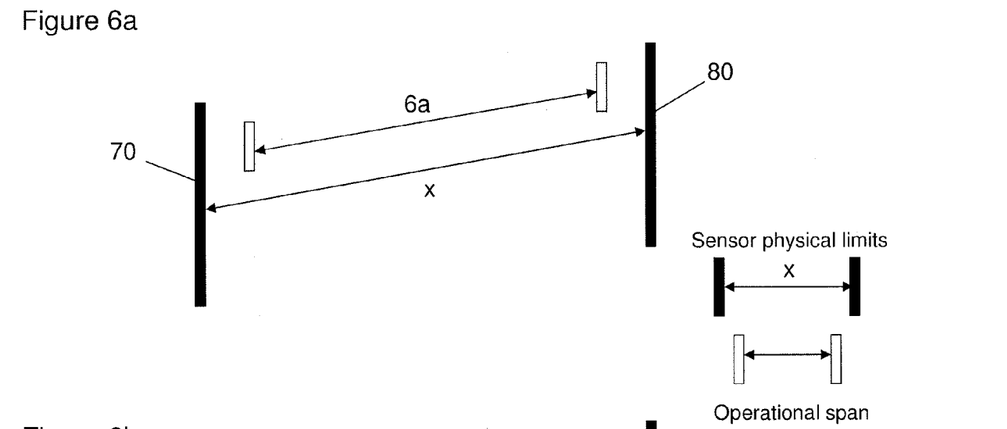
Figure 6B:
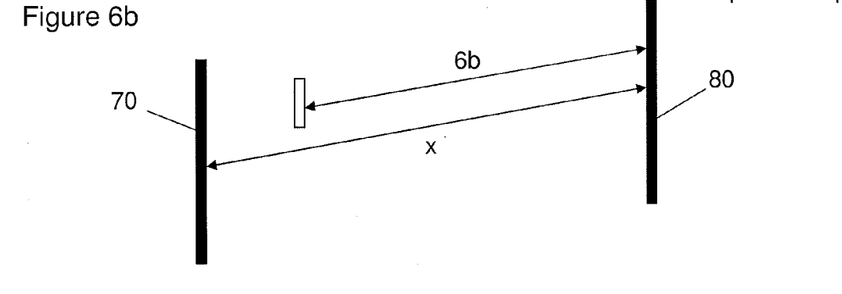
Figure 6C:
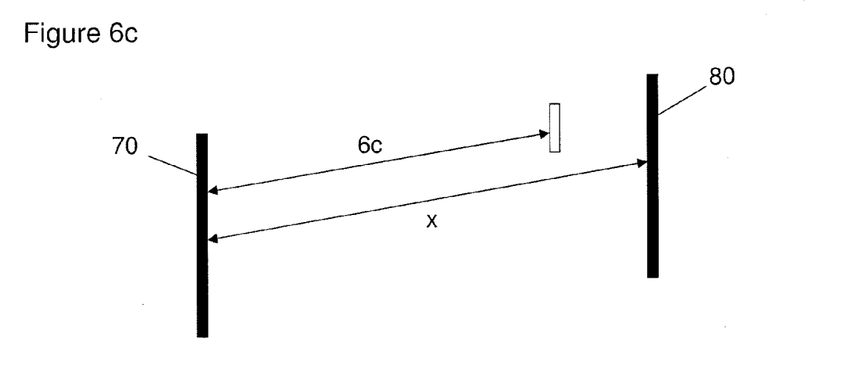

In order to calibrate the sensor device 50 the actuator 20 is operated to rotate the leadscrew 23 in a first direction until the nozzle ring 14 comes to a stop against one of its limits 21, 22 whereupon the servomotor S starts to stall indicating that leadscrew 23 is unable to rotate any further. During this operation the front disc 55 of the sensor wheel 53 may have been brought to a stop by virtue of engagement of the pin 57 with the limit stop 58 in which case the clutch 60 slips and the disc 55 is at one end of its rotation travel range. The actuator 20 is then reversed to rotate the leadscrew 23 in the opposite direction and move the nozzle ring 14 to the other of the limits 21, 22. The sensor wheel 53 rotates in the opposite direction and if the pin 57 did not hit the limit stop 58 in the previous direction of rotation it may well come into contact with the limit stop 58 in this direction in which case the wheel is at the other end of its rotational travel range. If the sensor wheel pin 57 does not encounter the limit stop 58 during either of these operations this means the wheel 53 occupied a relatively central position upon initiation of the calibration routine. This is illustrated in FIG. 6, by arrow X which indicates the angular rotational range limits 70, 80 of the sensor device 50 provided by the limit stop 58. In FIG. 6a the sensor wheel position is initially more or less central and the pin 57 does not encounter the range limits 70 or 80 during the calibration routine. In FIG. 6b the sensor wheel encounters an upper limit 80 of rotation during the calibration process but not the lower limit 70, and in FIG. 6c the sensor wheel 53 encounters a lower limit 70 of rotation during the calibration process.

Figure 7:
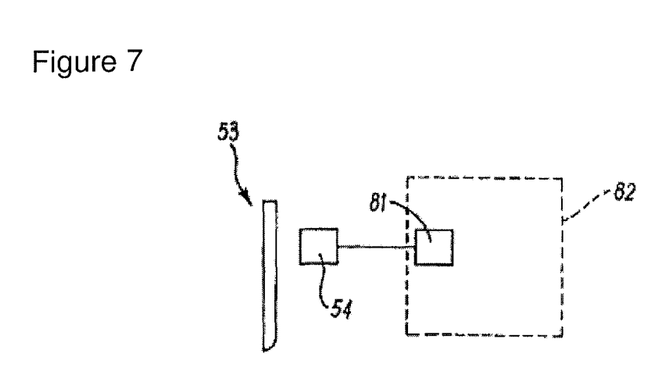

The linear output voltage generated by the sensor 54 in response to the sensor wheel 53 rotation is transmitted to an analogue to digital converter 81 input to a microprocessor-based controller 82, as illustrated in FIG. 7. The output voltage, being representative of a rotational position of between 0-360°, is digitised using 10-bit resolution into incremental steps of 0 to 1023. The actual operational range may be limited to a smaller angle with consequent reduction of the output voltage range. As an example, let us say that the calibration process establishes that the output voltage representative of 0° is 0.62V whereas the output voltage representative of 360° is 4.34V. Using a 5V analogue conversion, where 0V=0 step and 5V=1023 steps the rotational range provides a resolution of 762 steps (at the lower limit 0.62/5*1023=127 steps and at the upper limit 4.34/5*1023=889 steps). In practice and in order to produce a more meaningful step range, the lower limit is subtracted from the read value to arrive at an output voltage digital value in the range 0 to 761. Accordingly once the lower limit of rotation has been established the digital value can be stored and subtracted from all sensed position voltages. The initial rotation of the leadscrew 23 in the first direction is then repeated and the digital value of the sensor 54 is logged as the offset value. The two steps may then be repeated and checks made to verify that the sensor wheel is now operating between its limits.

As there are no significant forces that act on the front disc 55 of the sensor wheel 53 it can be fabricated from a lightweight material such as a plastic.

The method and apparatus provides for automatic calibration of the actuator 20 and nozzle ring 14 by allowing the actuator to be mounted on the turbocharger with its output shaft in any angular position regardless of the axial position of the nozzle ring 14. The calibration routine is performed on command under the control of the microcontroller 82 which may be part of an engine management system. The relative alignment of the actuator shaft and the nozzle ring 14 is fixed for all subsequent operation. The method thus reduces the complexity and labour time involved in this part of the manufacturing assembly procedure. As a consequence there is generally a reduction in fitting errors and less equipment is required to perform the installation process. It also allows for more efficient servicing, or maintenance.

In short the calibration routine can be summarised by the following steps:

move the nozzle ring in a first traverse to a first limit of its travel (the clutch may or may not have slipped during this movement).

move the nozzle ring in a second traverse to the other limit its travel. At this point the clutch wheel will have slipped in this travel or will be away from its limit having been slipped by the first movement. In either case it is safe to store the output signal in memory as a limit value.

move nozzle back again in a third traverse to the first limit. No clutch slippage can now occur and the value of the output signal at this limit can be logged.

The clutch will generally slip either during the first or second traverse of the nozzle ring or not at all if the sensor wheel range was initially disposed such that it was wholly within the range of the nozzle ring movement. This method removes the need for any conditional logic and it the start position does not matter.

In one possible embodiment the nozzle ring may have a range of movement that is exploited in normal operation (the "in-use" range governed by, for example, the engine management or control system) and which falls entirely within the sensor rotational range but a wider theoretical range of movement limited by physical stops that exceed the sensor range at each end. In this arrangement calibration of the actuator would always result in the slipping of the clutch on the sensor device. Depending on the initial direction of travel, the last traverse of the nozzle ring could be arranged to result in the alignment of one end of the sensor wheel range of rotation with the nozzle ring in a closed position with the result that the sensor output value would always have the same value at that closed position. This value could be logged and thereafter further calibration steps avoided so as not to reset the logged value. In practice, the rotational range of the sensor wheel should exceed the in-use range of movement of the nozzle ring to prevent errors, preferably by at least 2% and more preferably by at least 10%.

If the output signal at only one positional limit of the nozzle ring is to be logged this would generally be in the position where the nozzle ring is closed as accurate movement is generally required at this end of the range of travel of the ring.

Calibration may be performed each time the engine is switched on or off or after any power reconnection following a power disconnection as well as during a diagnostic check up, installation routine or service.

The arrangement described above can be used to detect an abnormal decrease in the range of movement of the nozzle ring causing the engine control unit to take remedial action such as, for example, effecting an interruption of the oil supply to the turbocharger and a staged shutdown or simply generating an audio or visual alarm.

Numerous modifications and variations to the embodiment described above may be made without departing from the scope of the invention as defined in the appended claims. For example, the detail of the variable geometry mechanism, including the nozzle ring and its manner of mounting and movement, may vary from that shown. Moreover, it will be appreciated that the actuator could be applied to other forms of variable geometry mechanism such as for example an annular array of swing vanes. In addition, the sensor output may be an analogue voltage, a phase, a frequency value or a digital signal. The sensor device may include any suitable position sensor in addition to those referred to above including for example an optical decoder, an inductive based sensor for detecting phase angle or frequency output, or a capacitive based sensor. A non-linear output may be produced by some types of sensor with appropriate processing performed by signal processing either locally at the actuator or elsewhere such as in the engine control unit.

The invention claimed is:

1. A method for automatically calibrating a variable geometry turbine actuator, the turbine having an annular inlet passageway, the passageway being closable at least partially by adjusting the position of a variable geometry element, the variable geometry element being movable between first and second limit positions, the method comprising the steps of:
   a) providing an actuator having an output shaft;
   b) coupling the actuator output shaft to a transmission mechanism for moving the variable geometry element;
   c) providing a rotary sensor device coupled to the output shaft of the actuator, the rotary sensor device comprising a sensor wheel with a stop, a clutch mechanism and a rotary position sensor, the rotary sensor device being arranged to convert movement of the actuator output shaft into rotation of the sensor wheel, the sensor wheel having a rotational range that is limited by said stop, the rotary position sensor being configured to generate an output signal representative of the rotary position of the sensor wheel;
   d) operating the actuator output shaft so as to rotate the sensor wheel in a first rotational direction until the variable geometry element reaches the first limit position;
   e) operating the actuator output shaft so as to rotate the sensor wheel in a second direction until the variable geometry element reaches the second limit position;
   f) allowing the sensor device to declutch from the actuator in the event the wheel is prevented from rotating by the stop in either direction of rotation, thereby ensuring the range of movement of the variable geometry element in use occurs within the rotational range of the sensor; and
   g) logging, as a limit value, the value of said output signal generated when the variable geometry element is at one of said first or second limit positions.

2. A method according to claim 1, wherein the limit value is logged at the second limit position.

3. A method according to claim 2, further comprising the step of operating the actuator output shaft so as to rotate the sensor wheel in said first rotational direction again, after step e) above until the variable geometry element reaches the first limit position.

4. A method according to claim 3, wherein the value of the output signal at said first limit position is logged as a further limit value after the sensor wheel is rotated in the first rotation direction again.

5. A method according to claim 4, further comprising the step of monitoring said output signal during operation of the actuator and deducting one of the limit value or the further limit value from the output signal and using this to determine the position of the variable geometry element.

6. A method according to claim 1, wherein the annular inlet passageway is defined between facing annular walls of the turbine and the variable geometry element is a movable one of the annular walls.

7. A method according to claim 6, wherein said movable annular wall is translatable along its central axis to adjust the width of the annular passageway.

8. A method according to claim 1, further comprising the steps of using the actuator to drive a leadscrew transmission mechanism, said leadscrew mechanism comprising a leadscrew shaft and a leadscrew nut threadedly engaged on a threaded portion of the leadscrew shaft, the     leadscrew mechanism being arranged so that rotation of one of said leadscrew shaft and leadscrew nut relative to the other produces linear movement in the other of said leadscrew shaft and leadscrew nut in the direction of the leadscrew axis, the leadscrew transmission mechanism being connected between the variable geometry element and the actuator.

9. A method according to claim 8, the nut being connected to the variable geometry element by a linkage, further comprising the step of driving the leadscrew shaft in rotation and restraining the nut against rotation so as to effect movement in the linkage and therefore the variable geometry element.

10. A method according to claim 1, further comprising the step of using a gear wheel to couple the output shaft and the sensor wheel.

11. A method according to claim 10, further comprising the step of providing a slip clutch between the gear wheel and the sensor wheel.

12. A method according to claim 1, further comprising the step of transmitting the output signal to a microcontroller for digitising.

13. A variable geometry turbine actuator comprising:

a turbine wheel mounted within a turbine housing on a shaft for rotation about an axis, the turbine housing defining an annular turbine inlet passageway around the turbine wheel;

the passageway being closable at least partially by adjusting the position of a variable geometry element, the variable geometry element being movable between first and second limit positions, a transmission mechanism for moving the variable geometry element; and     an actuator coupled to the transmission mechanism for actuating the variable geometry element having an output shaft for coupling to a transmission mechanism for moving the variable element; a rotary sensor device coupled to the output shaft of the actuator, the rotary sensor device comprising a sensor wheel with a stop, a clutch mechanism and a rotary position sensor; the rotary sensor device being arranged to convert movement of the actuator output shaft into rotation of the sensor wheel, the sensor wheel having a rotational range that is limited by the stop, the rotary position sensor being configured to generate an output signal representative of the rotary position of the sensor wheel; the sensor wheel being rotatable by the actuator in a first rotational direction until the variable element reaches the first limit position and in a second rotational direction until the variable element reaches the second limit position; the clutch mechanism allowing the sensor wheel to declutch in the event that it encounters the stop in either direction of rotation.

14. A variable geometry turbine actuator according to claim 13, wherein the variable geometry element is a movable annular wall defining part of said passageway.

15. A variable geometry turbine actuator according to claim 14, wherein the movable wall is translatable along an axis to adjust the width of the annular passageway.

16. A variable geometry turbine actuator according to claim 15, wherein the movable wall is connected to a linkage for connection to the transmission mechanism.

17. A comprising a variable geometry turbine actuator according to claim 13, and further comprising a rotary shaft on which said turbine wheel is mounted, a compressor wheel mounted within a compressor housing on the other end of said rotary shaft for rotation with the turbine wheel about said axis.

18. A variable geometry turbine actuator according to claim 17, wherein a bearing housing is interposed between the turbine and compressor housings, the actuator being mounted in the bearing housing.

19. A variable geometry turbine actuator according to claim 17 connected to an engine management system, the output signal being transmitted to a processor in an engine management system for recording an offset value when the variable geometry element reaches one of the first or second limiting positions.

* * * * *